(12) United States Patent
Izquierdo et al.

(10) Patent No.: US 10,999,339 B2
(45) Date of Patent: May 4, 2021

(54) SYSTEMS AND METHODS FOR TARGETED DELIVERY OF CONTENT TO AND MONITORING OF CONTENT CONSUMPTION AT A COMPUTER

(71) Applicant: DEVFACTO TECHNOLOGIES INC., Edmonton (CA)

(72) Inventors: Christians Izquierdo, Edmonton (CA); David Cronin, St. Albert (CA)

(73) Assignee: DEVFACTO TECHNOLOGIES INC.

( * ) Notice: Subject to any disclaimer, the term of this patent is extended or adjusted under 35 U.S.C. 154(b) by 394 days.

(21) Appl. No.: 15/966,932

(22) Filed: Apr. 30, 2018

(65) Prior Publication Data

US 2019/0334967 A1 Oct. 31, 2019

(51) Int. Cl.
G06F 11/34 (2006.01)
H04L 29/06 (2006.01)
H04L 29/08 (2006.01)

(52) U.S. Cl.
CPC .......... H04L 65/4076 (2013.01); H04L 67/22 (2013.01); H04L 67/306 (2013.01)

(58) Field of Classification Search
CPC ........ G06F 16/337; G06F 9/451; G06F 11/34; H04L 67/22; H04L 67/306; H04L 65/1066

See application file for complete search history.

(56) References Cited

U.S. PATENT DOCUMENTS

| | | | | |
|---|---|---|---|---|
| 7,818,419 B1 * | 10/2010 | McAllister | ......... | G06Q 30/0244 709/224 |
| 2011/0173534 A1 * | 7/2011 | Huang | .................. | G06F 16/335 715/702 |
| 2014/0165001 A1 * | 6/2014 | Shapiro | ................... | G06F 16/54 715/811 |
| 2014/0278308 A1 * | 9/2014 | Liu | .......................... | H04L 67/22 703/6 |
| 2014/0279821 A1 * | 9/2014 | Saliba | .................... | G06N 5/022 706/61 |
| 2014/0335497 A1 * | 11/2014 | Gal | .......................... | G09B 5/08 434/323 |
| 2016/0070434 A1 * | 3/2016 | Clark | ...................... | G06F 9/452 715/762 |
| 2016/0212178 A1 * | 7/2016 | Zhang | ................. | H04L 65/1066 |
| 2017/0315849 A1 * | 11/2017 | Salas | ........................ | G06F 9/542 |
| 2018/0204061 A1 * | 7/2018 | Antol | .................. | G06F 11/3433 |

\* cited by examiner

*Primary Examiner* — Merilyn P Nguyen
(74) *Attorney, Agent, or Firm* — Kirsten M. Oates; Rodman and Rodman LLP

(57) ABSTRACT

Systems and methods for targeted delivery of content to and monitoring content consumption involve determining whether to target a computer for delivery of content by evaluating content contextual information associated with a user. The content contextual information can be determined from stored data, by analyzing the computer's interaction with an information management system, or by analyzing computer inputs affecting the display of prior content on a display device of the computer. If the computer is to be targeted, then the server causes the content to be transmitted to the computer. The server also determines content delivery characteristics, such as when to transmit the content to the computer or an alert type to be transmitted with the content, based on the content contextual information. The server may generate a report on content consumption based on computer inputs affecting the display of the content on a display device of the computer.

12 Claims, 8 Drawing Sheets

SYSTEMS AND METHODS FOR TARGETED DELIVERY OF CONTENT TO AND MONITORING OF CONTENT CONSUMPTION AT A COMPUTER

FIELD OF THE INVENTION

The invention relates methods and systems of distributing content via electronic means, and more particularly to targeting the distribution of content to and monitoring the consumption of content by staff within an organization.

BACKGROUND OF THE INVENTION

Organizations use many different methods to communicate content with their staff. These include traditional physical methods like paper newsletters, bulletin board posters, phone calls, and periodic staff meetings. Physical bulletin boards are a major method of communication within many organizations, but they often present too much "noise" (e.g., social and personal messages that detract attention from organizational messages) and depend on the staff physically visiting the bulletin board, which makes bulletin boards ineffective for urgent methods especially when staff are physically remote from the bulletin board. Further, there are minimal engagement metrics to tell what staff have actually looked at on a bulletin board.

More recent electronic methods of communicating content with staff include email mailing lists, intranets, text messages, social networking platforms, electronic "dashboards", and reporting applications. However, as employees often receive many of these communications during working hours, their engagement may be down and little or no attention may be paid to each communication.

Furthermore, organizational awareness has not necessarily improved with the use of the more recent electronic communication methods. Organizations have little idea regarding who is actually reading or reacting to the communications, and lack the ability to measure the results of these communications. Certain trends have added to this problem. More workers are working remotely, for example in the field or from home.

A problem with email and mailing lists is that they tend to proliferate within large organizations. Thus there is a lot of "noise", making it easy for important messages to be ignored. Metrics regarding email and mailing lists tend to be poor. It is often also difficult for staff to know which lists are available.

Intranets also present certain problems. For example, they lack effective targeting functionality (using context), and often contain "siloed" sites (run by individual departments or teams). Intranets depend on staff "pulling" information (i.e., taking steps to actively retrieve information) from the Intranet rather than having the information delivered to them. Available engagement metrics are minimal.

Thus, there is a need for a system which targets the delivery of the right content to the right staff members at the right time while tracking detailed analytics about the content consumption, thereby allowing for useful insights that can be used to improve organizational awareness and staff engagement.

SUMMARY OF THE INVENTION

The system according to the invention provides a computer-implemented communication platform for organizations to communicate to their workforce.

The system according to the invention sources content from existing operational systems and publishing platforms, and converges the content into a single consistent content stream. The system curates this content stream for staff members based on their interests and context and then delivers it with a personalized priority and schedule. The system according to the invention can leverage the ubiquity of mobile devices to deliver content on the mobile device that each staff member finds most important. The system according to the invention gathers detailed user interaction data with a particular focus on how content is being read and consumed. Measurements made throughout the entire content lifecycle can be transformed into business insights that help improve communication effectiveness and workforce engagement.

In one aspect, the present invention comprises a method, implemented by a server, for targeted delivery of content to a computer controlled by a user, the method comprising the steps of:
(a) determining whether to target the computer for delivery of the content by evaluating content contextual information associated with the user in accordance with a rules database; and
(b) causing the content to be transmitted to the computer via a communications network, conditional on determining that the computer is to be targeted.

In embodiments of the method for targeted delivery of content, the content contextual information comprises an indicator of an expressed interest in the content by the user.

In embodiments of the method for targeted delivery of content, the method further comprises determining the content contextual information by analyzing the computer's interaction with an information management system.

In embodiments of the method for targeted delivery of content, the method further comprises determining the content contextual information by determining data indicative of prior content consumption at the computer. In embodiments, determining data indicative of prior content consumption at the computer may comprise receiving, via the communications network, and evaluating data indicative of an input by the user to the computer causing the computer to modify a display of the prior content on a display device the computer. In embodiments, the input causes the computer to display or stop displaying the prior content on the display device of the computer. In embodiments, the input causes the computer to scroll the display of the prior content on the display device of the computer, and the data indicative of the input comprises a scrolling speed. In embodiments, determining data indicative of prior content consumption at the computer further comprises determining a time associated with the input by the user to the computer.

In embodiments of the method for targeted delivery of content, the method further comprises determining a content delivery factor for transmitting the content to the computer, based on the content contextual information. In embodiments, the content delivery factor comprises a time for transmitting the content to the computer, and/or an alert type or notification level to be associated with the content when transmitted to the computer.

In another aspect, the present invention comprises a system for targeted delivery of content to a computer controlled by a user. The system comprises a server comprising a processor and a non-transitory memory storing instructions executable by the processor to implement an embodiment of a method for targeted delivery of content, as described above.

In another aspect, the present invention comprises a non-transitory computer-readable medium storing instructions executable by a processor to implement an embodiment of a method for targeted delivery of content, as described above.

In another aspect, the present invention comprises a method, implemented by a server, for monitoring consumption of content delivered to a computer controlled by a user, the method comprising the steps of:
 (a) receiving, via the communications network, data indicative of an input by the user to the computer causing the computer to modify a display of the content on a display device the computer; and
 (b) generating a report on the consumption of the content based on the data indicative of the input.

In embodiments of the method for monitoring consumption of content, the input causes the computer to display or stop displaying the content on the display device of the computer.

In embodiments of the method for monitoring consumption of content, the input causes the computer to scroll the display of the content on the display device of the computer, and the data comprises a scrolling speed.

In embodiments of the method for monitoring consumption of content, the method further comprises determining a time associated with the input to the computer, and the report is further based on the time of the input.

In another aspect, the present invention comprises a system for monitoring consumption of content delivered to a computer controlled by a user, the system comprising a server comprising a processor and a non-transitory memory storing instructions executable by the processor to implement an embodiment of a method for monitoring consumption of content, as described above.

In another aspect, the present invention comprises a non-transitory computer-readable medium storing instructions executable by a processor to implement an embodiment of a method for monitoring consumption of content, as described above.

BRIEF DESCRIPTION OF THE FIGURES

Exemplary embodiments of the present invention are described with reference to the following drawings. In the drawings, like elements are assigned like reference numerals. The drawings are not necessarily to scale, with the emphasis instead placed upon the principles of the present invention. Additionally, each of the embodiments depicted is but one of a number of possible arrangements utilizing the fundamental concepts of the present invention. The drawings are briefly described as follows.

DESCRIPTION OF THE INVENTION

Figure 1:
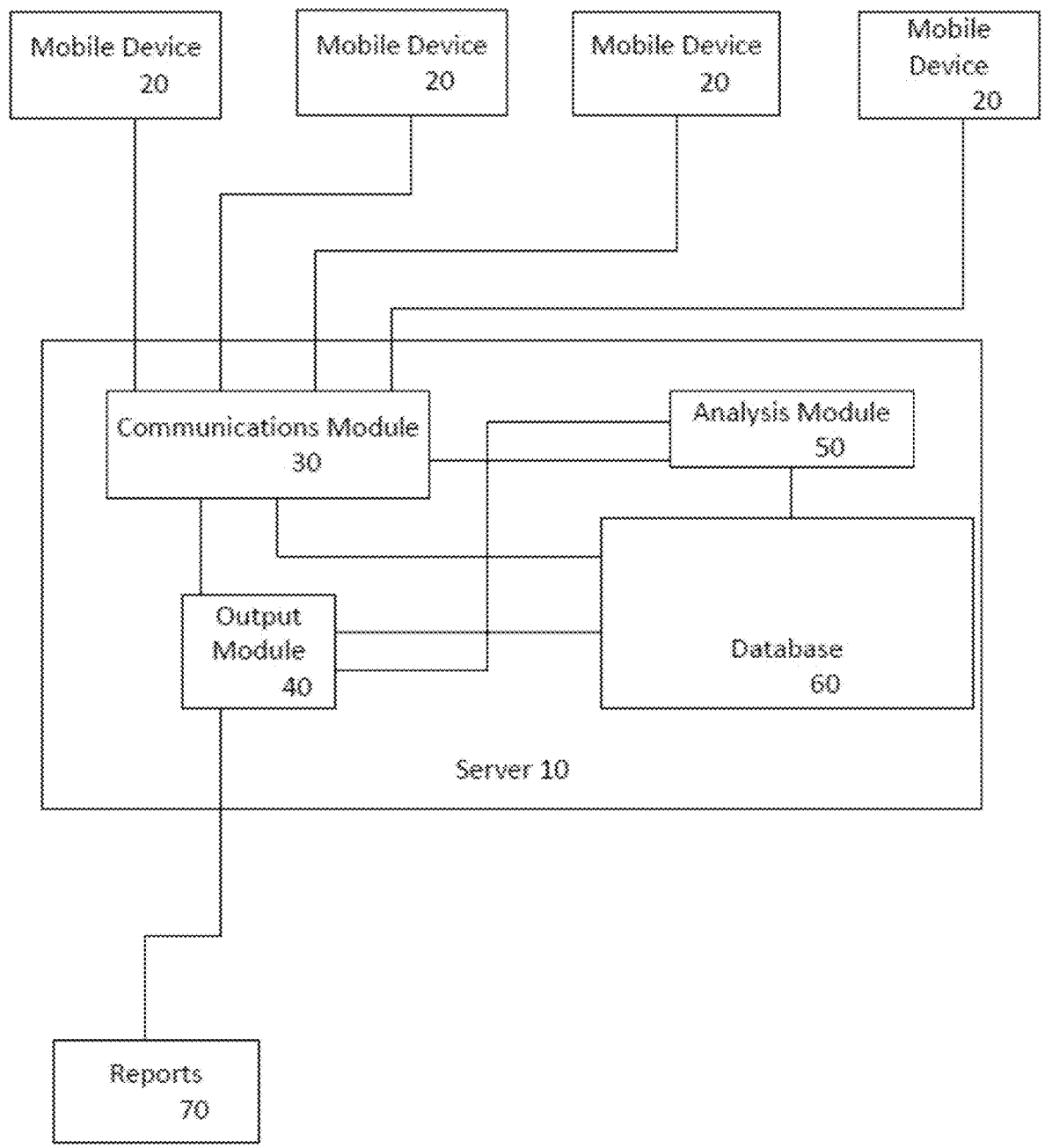
FIG. 1 is a functional block diagram of an embodiment of the system according to the present invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Interpretation

Any term or expression not expressly defined herein shall have its commonly accepted definition understood by a person skilled in the art.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "staff" means an entity providing services for an organization, and may be a contractor or an employee. Suppliers of goods may also be considered staff.

Where two or more terms or phrases are synonymous (e.g., because of an explicit statement that the terms or phrases are synonymous), instances of one such term/phrase, does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application), nor the headings (set forth in the body of the present application), nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim. Features of one embodiment may be combined with features of another embodiment, in addition to or in substitution for any of the other feature of the other embodiment. Accordingly, various changes and modifications can be made to the embodiments and exemplary uses without departing from the scope of the invention as defined in the claims.

Computer Implementation

The following discussion provides a brief and general description of a suitable computing environment in which various embodiments of the system may be implemented. Although not required, embodiments will be described in the general context of computer-executable instructions, such as program applications, modules, objects or macros being executed by a computer. Those skilled in the relevant art will appreciate that the invention, or components thereof, can be practiced with other computing system configurations, including hand-held devices, multiprocessor systems, microprocessor-based or programmable consumer electronics, personal computers ("PCs"), network PCs, mini-computers, mainframe computers, mobile phones, smart phones, tablets, personal digital assistants, personal music players (like iPods) and the like. The embodiments can be practiced in distributed computing environments where tasks or modules are performed by remote processing devices, which are linked through a communications network. In a distributed computing environment, program modules may be located in both local and remote memory storage devices.

As used herein, the terms "computer" (which includes mobile devices, such as smart phones, tablets, laptops, personal digital assistants, and personal music players, and "server" are both computing systems as described in the following. A computing system may be used as a server including one or more processing units, system memories, and system buses that couple various system components including system memory to a processing unit. Computing system will at times be referred to in the singular herein, but this is not intended to limit the application to a single computing system since in typical embodiments, there will be more than one computing system or other device involved. Other computing systems may be employed, such as conventional and personal computers, where the size or scale of the system allows. The processing unit may be any logic processing unit, such as one or more central processing units ("CPUs"), digital signal processors ("DSPs"), application-specific integrated circuits ("ASICs"), etc. Unless described otherwise, the construction and operation of the various components are of conventional design. As a result, such components need not be described in further detail herein, as they will be understood by those skilled in the relevant art.

The computing system includes a system bus that can employ any known bus structures or architectures, including a memory bus with memory controller, a peripheral bus, and a local bus. The system also will access to a memory which may include read-only memory ("ROM") and random access memory ("RAM"). A basic input/output system ("BIOS"), which can form part of the ROM, contains basic routines that help transfer information between elements within the computing system, such as during start-up.

The computing system also includes non-volatile memory. The non-volatile memory may take a variety of forms, for example a hard disk drive for reading from and writing to a hard disk, flash drive, and an optical disk drive; and a magnetic disk drive for reading from and writing to removable optical disks and magnetic disks, respectively. The optical disk can be a CD-ROM or BLU-RAY, while the magnetic disk can be a magnetic floppy disk or diskette. The hard disk drive, optical disk drive and magnetic disk drive communicate with the processing unit via the system bus. The hard disk drive, optical disk drive and magnetic disk drive may include appropriate interfaces or controllers coupled between such drives and the system bus, as is known by those skilled in the relevant art. The drives, and their associated computer-readable media, provide non-volatile storage of computer readable instructions, data structures, program modules and other data for the computing system. Although computing systems may employ hard disks, optical disks and/or magnetic disks, those skilled in the relevant art will appreciate that other types of non-volatile computer-readable media that can store data accessible by a computer may be employed, such a magnetic cassettes, flash memory cards, digital video disks ("DVD"). Bernoulli cartridges, RAMs, ROMs, smart cards, etc., or that the memory may be accessible through a network, for example in a "cloud".

Various program modules or application programs and/or data can be stored in the system memory. For example, the system memory may store an operating system, end user application interfaces, server applications, and one or more application program interfaces ("APIs").

The system memory also includes one or more networking applications, for example a Web server application and/or Web client or browser application for permitting the computing system to exchange data with sources, such as clients operated by users and members via the Internet, corporate intranets, or other networks as described below, as well as with other server applications on servers such as those further discussed below. The networking application in the preferred embodiment is markup language based, such as hypertext markup language ("HTML"), extensible markup language ("XML") or wireless markup language ("WML"), and operates with markup languages that use syntactically delimited characters added to the data of a document to represent the structure of the document. A number of Web server applications and Web client or browser applications are commercially available, such those available from Mozilla™, Google™, Apple™ and Microsoft™.

The operating system and various applications/modules and/or data can be stored on the hard disk of the hard disk drive, the optical disk of the optical disk drive and/or the magnetic disk of the magnetic disk drive.

A computing system can operate in a networked environment using logical connections to one or more client computing systems and/or one or more database systems, such as one or more remote computers or networks. The computing system may be logically connected to one or more client computing systems and/or database systems by a communications network under any known method of permitting computers to communicate, for example through a network such as a local area network ("LAN") and/or a wide area network ("WAN") including, for example, the Internet. Such networking environments are well known, including wired and wireless enterprise-wide computer networks, intranets, extranets, and the Internet. Other embodiments include other types of communication networks such as telecommunications networks, cellular networks, paging networks, and other mobile networks. The information sent or received via the communications channel may, or may not be encrypted. When used in a LAN networking environment, the computing system is connected to the LAN through an adapter or network interface card (communicatively linked to the system bus). When used in a WAN networking environment, the computing system may include an interface and modem (not shown) or other device, such as a network interface card, for establishing communications over the WAN/Internet.

In a networked environment, program modules, application programs, or data, or portions thereof, can be stored in the computing system for provision to the networked computers. In one embodiment, the computing system is communicatively linked through a network with TCP/IP middle layer network protocols; however, other similar network protocol layers are used in other embodiments, such as user datagram protocol ("UDP"). Those skilled in the relevant art will readily recognize that these network connections are only some examples of establishing communications links between computers, and other links may be used, including wireless links.

While in most instances the computing system will operate automatically, where an end user application interface is provided, an operator can enter commands and information into the computing system through an end user application interface including input devices, such as a keyboard, and a pointing device, such as a mouse. Other input devices can include a microphone, joystick, scanner, etc. These and other input devices are connected to the processing unit through the end user application interface, such as a serial port interface that couples to the system bus, although other interfaces, such as a parallel port, a game port, or a wireless interface, or a universal serial bus ("USB") can be used. A monitor or other display device is coupled to the bus via a video interface, such as a video adapter (not shown). The computing system can include other output devices, such as speakers, printers, etc.

Overview of the Invention

Computer systems have become central to collection of data and authoring of information in organizations. Exemplary embodiments of the invention for an exemplary use of targeting delivery of content to staff members of an organization and monitoring content consumption by staff members are now described.

A functional block diagram of an embodiment of a system according to the invention is shown in FIG. 1. Server (10) is in communication via a communications network (e.g., a LAN, WAN, and/or the Internet) with one or more staff computers (20) (i.e., under the control of staff members). In the exemplary embodiment, the staff computers (20) are mobile devices including but not limited to laptop computers, tablet computers, and smartphones. In other embodiments, the staff computers (20) may be desktop computers, or laptop computers. Communications module (30) controls the sending and receiving of information from staff computers (20), including email, messaging, web pages, as well as GPS coordinates and other information. The information is stored in database (60), which may be cloud-based, and is analyzed by analysis module (50). Reports (70) can be generated by output module (40), and sent to one or more staff computers (20) under direction of communications module (30). In an embodiment of the invention, server (10) may use cloud based storage and a scalable infrastructure to allow for large numbers of staff computers (20) to work with server (10).

An embodiment of a method of the invention implemented by the system shown in FIG. 1 is now described with reference to FIG. 2.

Content Receipt

Figure 2:
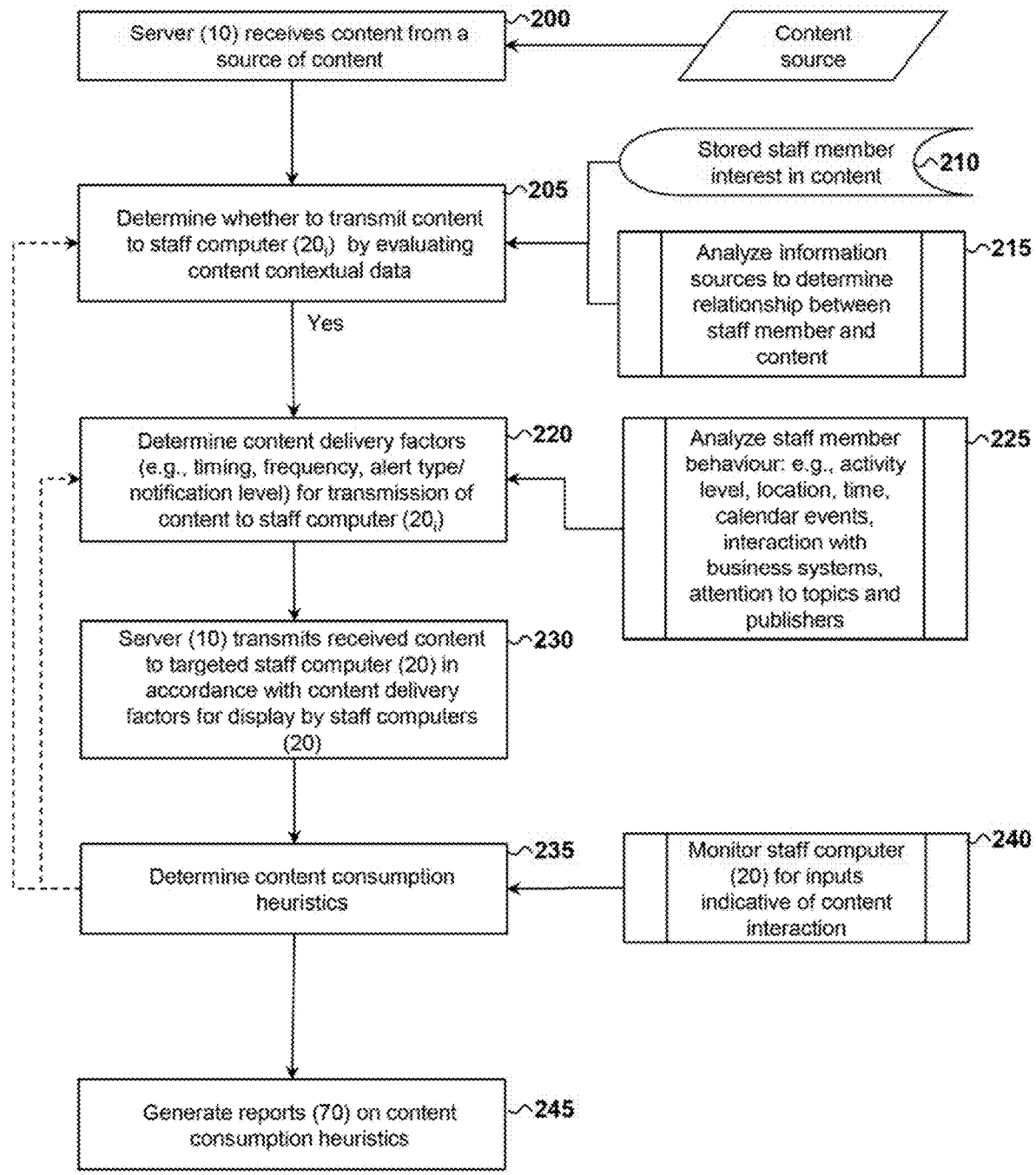
FIG. 2 is a flow chart showing an embodiment of a method of the present invention, as implemented by the embodiment of the system shown in FIG. 1.

Server (10) processes content from content sources of separate unrelated software systems, for example a document management system, a billing system, and an email system, and conforms the content into a single consistent content stream (see FIG. 2, step 200). This allows the system to establish relationships between content using metadata and effectively cross software system boundaries. The system may accept content from any source that is capable of calling a secured public application programming interface (API) endpoint on the Internet. This API provides a mechanism to publish multi-media content and the associated meta-data. Sources of content may also update or remove their content by re-calling the API with updated information. Server (10) may re-format text content and re-encode multi-media content to prepare for delivery to a multitude of different staff computers (20). Server (10) may also conform metadata into a consistent dimensional data model to ensure meaningful decisions can be made in subsequent stages.

The system according to the invention supports the display of dynamic content from a source that capable of calling a secured public API. This API provides a mechanism for server (10) to publish real-time data that is refreshed on a periodic or on-demand basis on a display device of the staff computers (20). Sources may update their dynamic visual content display by calling the API with updated information ("push") or by setting up a callback schedule ("pull"). The system will route the incoming dynamic data through the staged processing pipeline and provide content scoring metrics (as described below) as static content.

Content Contextual Information

The system according to the invention may include processes to target content to staff members to increase content consumption using content contextual information. This includes determining whether to transmit content to a particular staff computer ($20_i$) in accordance with a rules database (FIG. 2, step 205).

For example, a particular staff member's interests (as expressed by the staff member or as determined by content consumption characteristics, as discussed below), as stored in database (60) can be matched with content that is tagged with those same interests (FIG. 2, step 210).

Alternatively, an inherent social graph that exists in every organization to determine who would benefit from receiving that piece of content may be used. The inherent social graph in an organization shows the way that staff members are actually connected and often has little or no relationship with an organization's organizational chart. For example, even though a particular staff member may report to person A and have direct reports to persons B and C, that staff member may work regularly with persons D and E. This inherent social graph is not stored in any one particular place (e.g., it would not be within the computer science definition of nodes vertices and edges wherein the relationships are explicit). Instead, the social graph is based on the real life connections and interactions that staff members have every day and that can be constructed from analyzing business systems to see how people are actually interacting.

To determine the inherent social graph, the system may analyze one or multiple information sources related to content consumption patterns including email systems, document management systems, line of business systems, social platforms, etc. to understand the context in which a staff member operates (FIG. 2, step 215). For example, if the staff member is tracking time against Project X in a timesheet system and also contributing documents to a Project X site in a document management system, then the system may infer that the staff member is probably interested in information about Project X. This targeting decision may be made without the staff member ever explicitly expressing interest in that project.

Content Delivery Factors

The system, via communications module (30), may deliver information by using mobile apps installed on the staff computers (20) that are globally accessible to staff. The system may adapt its delivery process to a particular staff member to increase the probability that the staff member will consume the delivered content.

The system may determine and auto-tune content delivery factors that are unique to each staff computer (20) in accordance with a rules database (FIG. 2, step 220). These content delivery factors may be related to the frequency or timing of content transmission, and a type of alert or notification level for each staff member.

The content delivery factors may be based on analyzing indicators of staff member behavior, as indicated by interactions with computer systems, such as the staff member's activity level, location, time of day, calendar events, interaction with other business systems, and attention to particular topics and publishers (FIG. 2, step 225).

For example, attention to particular topics and publishers indicates that the system will build knowledge over time about what people actually read and which publishers are the most successful at connecting with the staff member. The primary intent of this insight is to educate the publishing community on how to write and structure content for better readership, but a side-effect is that the system will also know when a particular piece of content is likely to get a particular staff member's attention based on their level of attention for that topic/publisher in the past.

If the staff member's behaviour changes, for example, if reading patterns change (as determined by the content consumption heuristics as described below), then the system will use that information to improve the likelihood the next piece of content will be consumed. The content delivery factors are used to determine preferred delivery time windows, and notification levels and frequencies for each staff computer (20). For example, if the staff member normally slowly reads through an article, except when they receive articles during the afternoon between 5 and 6 PM, in which case the staff member quickly scans through the article, then the system may determine that during the later time slot the staff member is defaulting to a "content grazing" behavior (e.g., because the staff member is travelling home on the train, is tired, has low concentration, or is just rapidly scanning). The system may then delay notifying the staff member of new content (unless it is an urgent notification) for a time slot that is known to be more effective for content consumption for that staff member.

Dynamic Visual Content Display

The system, via Communications Module (30), causes the content to be transmitted to targeted staff computers (20) in accordance with the determined content delivery factors (FIG. 2, step 230).

Figure 3:
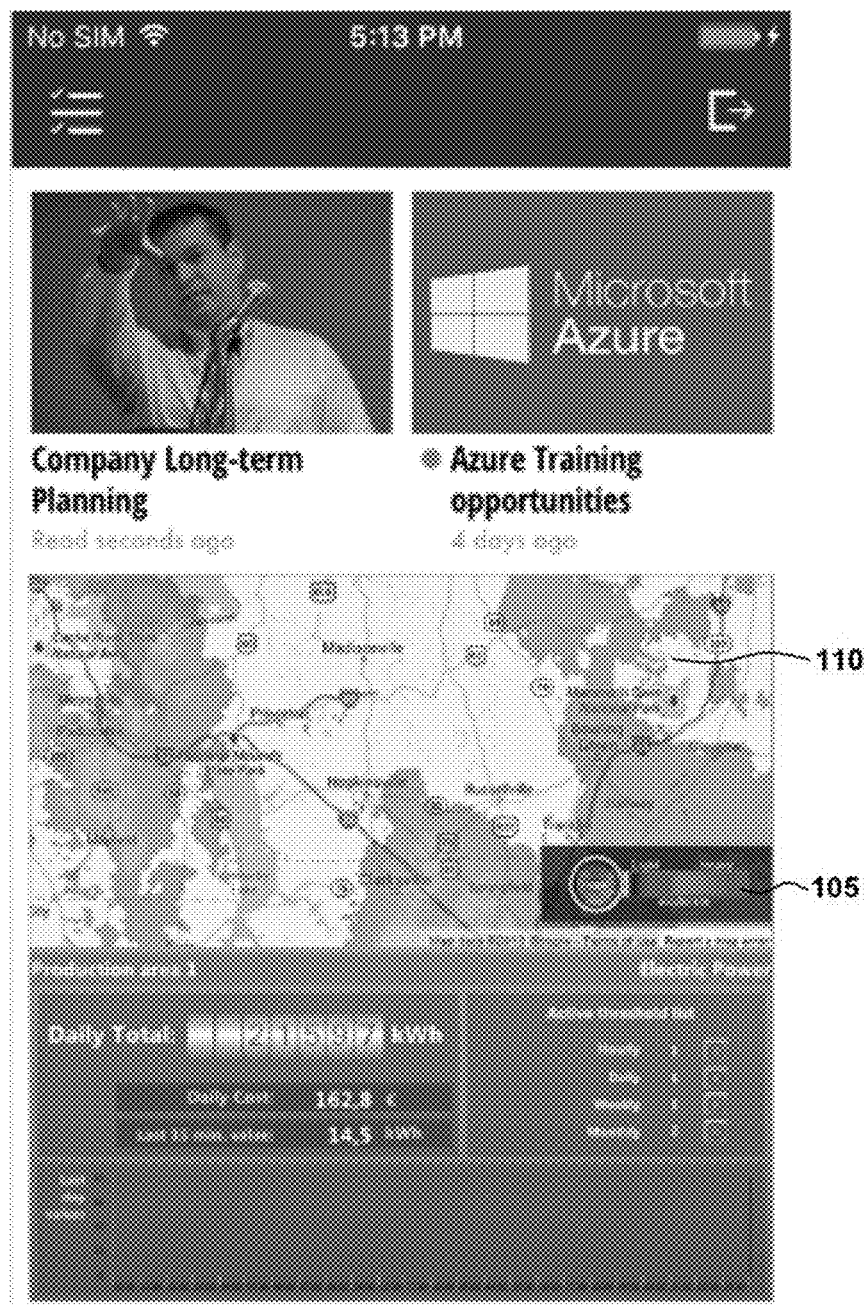
FIG. 3 is an embodiment of a micro-dashboard, according to the invention, for displaying content to a staff member.

The system according to the invention may support the distribution of point-in-time displays generated from software systems in a visual "dashboard", an example of which is shown in FIG. 3. With reference to the embodiment shown in FIG. 3, for example, heat map (105) is overlaid and updated on geographic map (110). The dynamic visual content displays provide access to content that staff members would normally have to log-in to other software systems to see. The content may be displayed in a staff computer (20), through software such as a mobile app, in a format similar to a news stream.

Content Consumption Heuristics

The system may track heuristics about the "who/what/where/when/why/how" of the content consumption process (i.e., the processes by which staff members partake in the content") (FIG. 2, step 235). This may include tracking how long it took from the content being published to the time that content arrived on the staff computer (20), to when the staff member read the content, how long the staff member took to read the content, how often the staff member read the content, how the staff member read the content (e.g., one pass from top to bottom, or moving up and down over the content), how the staff member rated the content, if they read the entire content (for example if they stopped before finishing or went through the content too quickly to actually read it), and if they read related content (that was either attached to or linked from the primary content) (FIG. 2, step 240).

Such interaction between the staff member and the content may be determined by receiving data (via the communication network between the server (10) and the staff computers (20)), of inputs to the staff computer (20), and determining the timing of these inputs to the staff computer (20) that affect the display of the content on the staff computer (20) or otherwise indicate interaction with the content on the staff computer (20). Examples of these inputs include inputs for opening/foregrounding for content views, closing/backgrounding for content views, scroll patterns for content views, multi-media views, hyperlink clicks, social reactions, sharing, and re-reads. As the system is focused on an organization's internal audience, staff members have typically already accepted policies allowing the employer to track and collect this data and provide it to the content publishers (for example, an internal corporate communication's department).

As noted above, the determined content consumption heuristics can be used in determining whether to target a staff computer for further content delivery, and for determining content delivery factors for further content delivery. (This relationship is noted by the dashed lines in FIG. 2.) As such, the system can be "self-learning" or "self-training" to target delivery of content so as to trend towards more optimal content consumption heuristics.

Content Consumption Reporting

Figure 4:
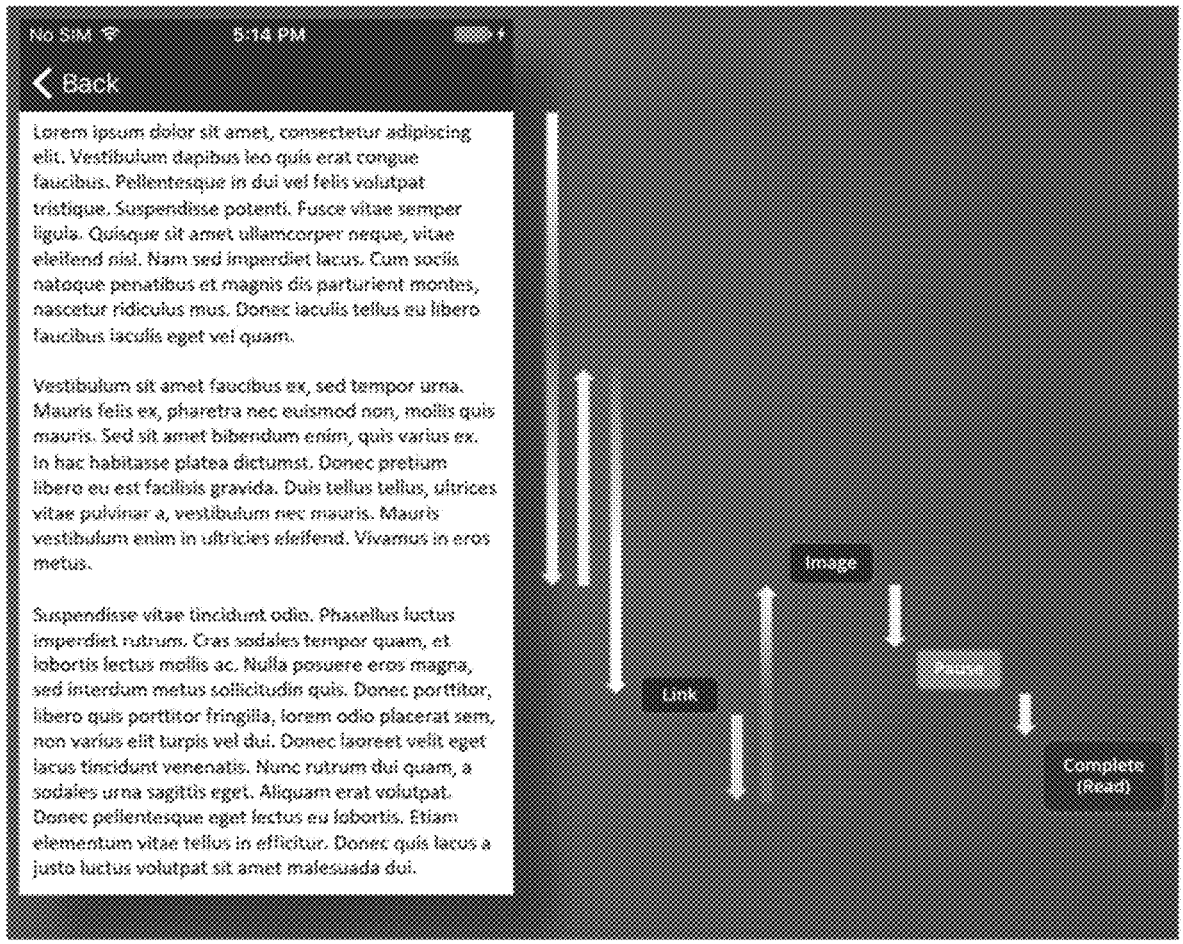
FIG. 4 is an embodiment of a display of content consumption heuristics, according to the invention, for particular content consumed by a staff member, in the case where the staff member has slowly examined the content.
Figure 5:
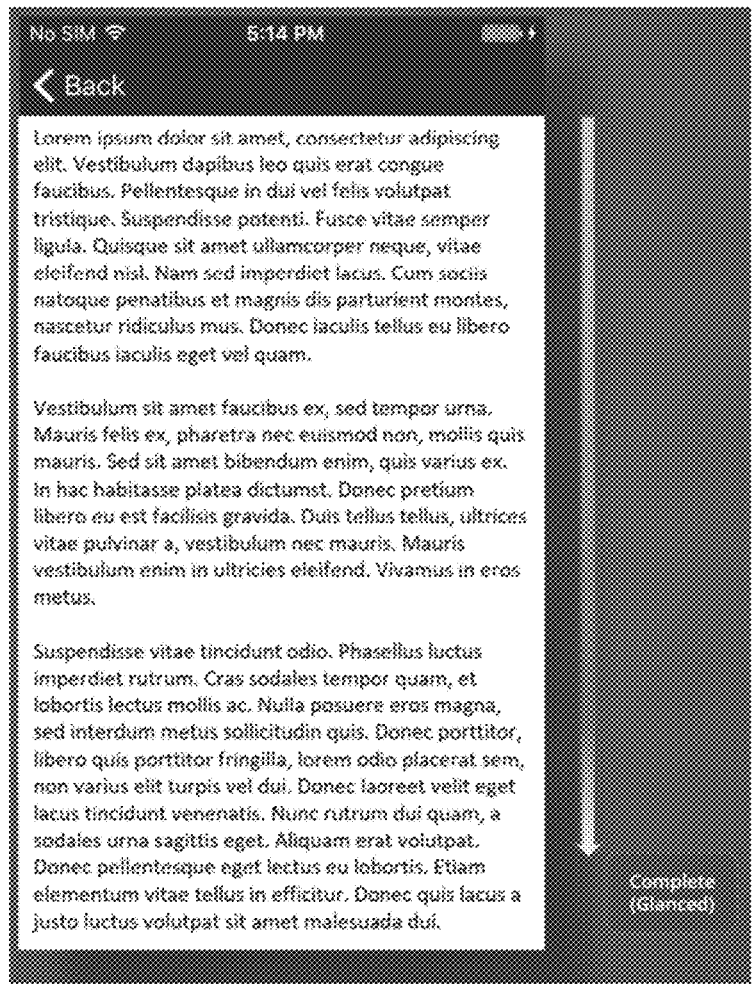
FIG. 5 is an embodiment of a display of content consumption heuristics, according to the invention for particular content consumed by a staff member, in the case where the staff member only glanced at the content.

All of the data that is collected may be processed to produce reports (70) (FIG. 2, step 245), examples of which are shown in FIGS. 4 and 5, for the content publishers using app events tracking the content consumption on the mobile device (20).

In FIGS. 4 and 5, the graphical markers to right of the content, are indicative of the inputs received by the staff computer (20) from the user, and arranged chronologically from left to right. The arrows are indicative of scrolling inputs, with the darker shading indicative of an input for faster scrolling speed. In the example shown in FIG. 4, a staff member has slowly examined the content, has re-read portions of the content, linked to related content and paused while reading. In contrast, in the example shown in FIG. 5, the staff member has very quickly scrolled through the content, too quickly to have absorbed it.

Content Awareness

Figure 6:
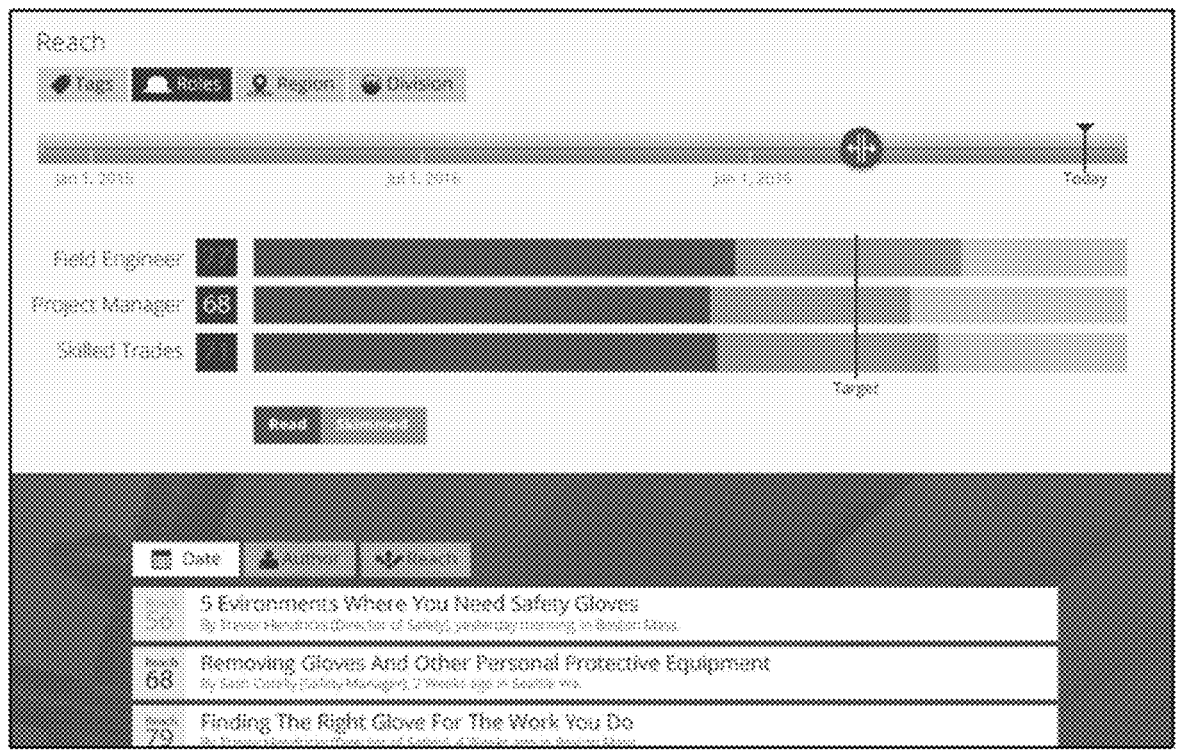
FIG. 6 is an embodiment of a display of content awareness, according to the invention, of particular content.

The system then uses these inputs to output a read score, as shown in FIG. 6 representing attention, coverage, and interest level for the content. The read score can be used to promote improvements to the content publishing process of organizations to increase readership, focus time and efforts on content that is actually of interest to the staff, and determine when content should be delivered and in what format to deliver the highest impact. The read scores may be categorized, for example on a 100 point scale, a score from 50 to 100 are categorize as "Read", scores from 20 to 49 are categorized as "Skimmed" and scores below 20 are categorized as "Skipped". The actual scale and terminology may be selected by system administrators. The read scores may be determined uniquely for a particular staff member associated with a particular staff computer (20), or aggregated over numerous staff computers (20), which may be categorized according to attributes such as the role, region and division of the associated staff member. In FIG. 6, for example, read scores are determined separately for staff computers (20) used by a field engineer, a project manager, and skilled tradespersons.

The system according to the invention may calculate the effective reach and awareness for a piece of content, one or more keywords, or a topic of interest. "Reach" is defined herein as the total number of staff members exposed to the content using the read score as described above.

The system then returns an awareness score on each piece of content for each staff member. As inputs, the system uses the individual read scores, an awareness degradation factor, and staff member attributes to produce a temporal awareness score. The awareness score can be aggregated or segmented to view awareness from multiple perspectives (e.g. awareness level for a topic at the corporate department level). The system may provide a mechanism for administrators and content publishers to see real-time reports on the awareness score using any of the configured dimensions (e.g., region, role, and topic).

Figure 7:
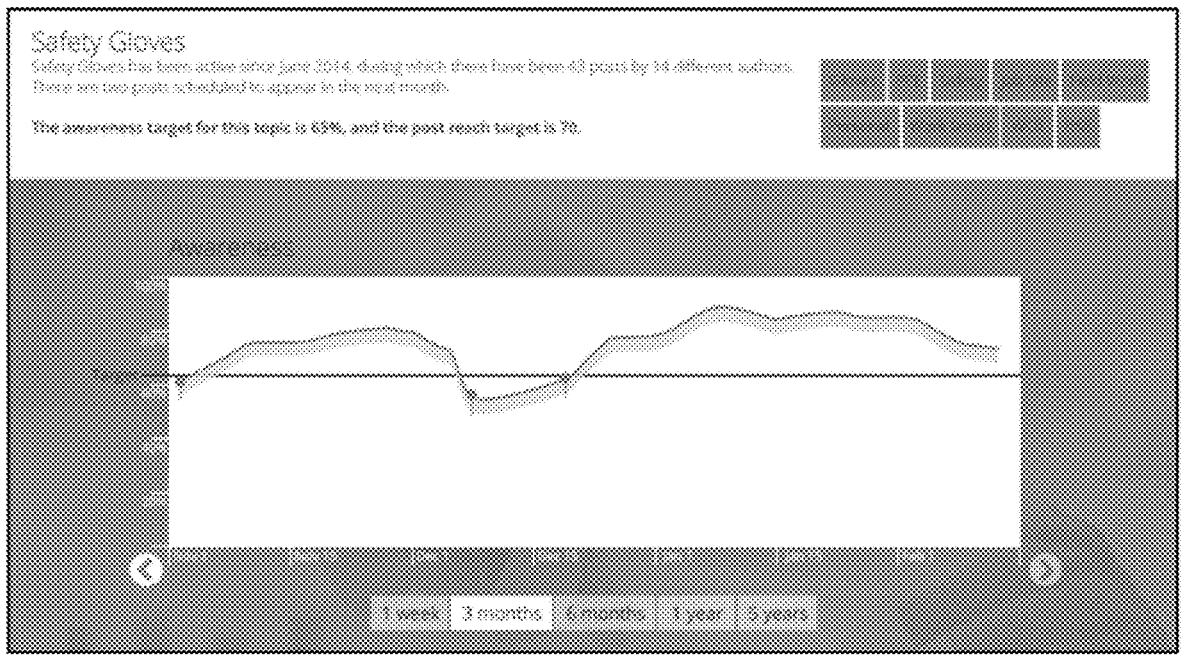
FIG. 7 is an embodiment of a display of a content awareness tracking over time, according to the invention, through an organization.

The system may support a mechanism to query specific content, keywords, or topic areas and see how they've spread through an organization based on the reach and awareness scores. This information can be viewed in multiple ways (on a map, by role, by division, etc.) at, any point in time or animated over time as shown in FIG. 7. This information allows administrators and content publishers to understand how content is currently flowing through the organization, how aware the staff members actually are, and then adjust communication patterns to improve awareness.

Content Publication Planning

Figure 8:
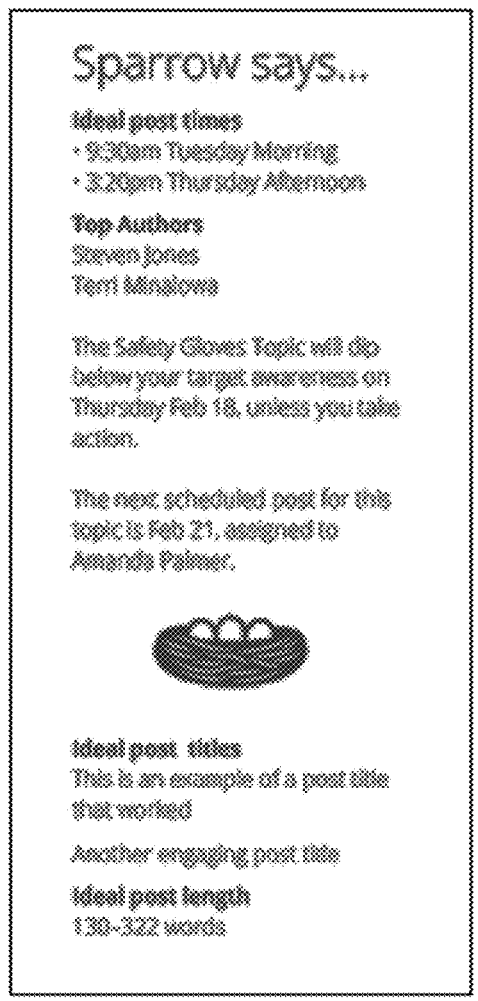
FIG. 8 is an embodiment of a report, according to the invention, to assist in the dissemination of content.

The system according to the invention may use the content consumption heuristics to produce feedback for content publishers, using a report, an example of which is shown in FIG. 8. The desired outcome for an organization is typically to promote meaningful improvements to the content publishing process to increase readership, focus time on content that is actually of interest to staff members, and determine when content should be delivered and in what format, to deliver the highest impact. For example, if a piece of content is delivered, and the majority of staff members quickly scroll down and then stop to look at the pictures/video but don't spend time on the text this becomes useful feedback to the publishers that for this topic the content should be more visual and less time and money should be spent on preparing text (e.g., provide a few quick bullet points and then use other forms of media like video to deliver more information).

Exemplary Uses

Example 1: An exemplary use of the system may be to promote workplace safety, by ensuring that new safety procedures have a high content awareness and high individual read scores for relevant staff members. Using the system according to the invention, an organization can send new safety content in circumstances at which it is most likely to be consumed, and can track the read score and awareness score of the content. Such information may be relevant in the future, for example a law suit based on a workplace injury.

Example 2: Corporate information is distributed to relevant staff members, and managers can view awareness scores by topic and population segment to determine which content is being, consumed and which is not. This helps reduce the occurrence of management dissatisfaction with staff because management thinks staff is actively disobeying/ignoring procedures when in fact the staff just have not received and processed the relevant content. Staff engagement increases when staff feel communicated to, and are not being disciplined for, what they feel is an unfair reason.

Example 3: Highly targeted content can be delivered outside of traditional methods in which staff members receive tens/hundreds of emails that are mostly ignored. Staff members choose their interests and the system adapts based on the staff member's behavior and then delivers the content that it believes to be interesting to the staff member based on their social graph. The system actively tracks the staff member's reaction to these attempts and learns from failure.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

The present methods, systems and articles also may be implemented as a computer program product that comprises a computer program mechanism embedded in a computer readable storage medium. For instance, the computer program product could contain program modules. These program modules may be stored on CD-ROM, DVD magnetic disk storage product, flash media or any other computer readable data or program storage product, including cloud based storage. The software modules in the computer program product may also be distributed electronically, via the Internet or otherwise, by transmission of a data signal (in which the software modules are embedded) such as embodied in a carrier wave.

For instance, the foregoing detailed description has set forth various embodiments of the devices and/or processes via the use of examples. Insofar as such examples contain one or more functions and/or operations, it will be understood by those skilled in the art that each function and/or operation within such examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a computer program product in a variety of forms, and that an illustrative embodiment applies equally regardless of the particular type of signal bearing media used to actually carry out the distribution. Examples of signal bearing media include, but are not limited to, the following; recordable type media such as floppy disks, hard disk drives, CD ROMs, digital tape, flash drives and computer memory; and transmission type media such as digital and analog communication links using TDM or IP based communication links (e.g., packet links).

Further, in the methods taught herein, the various acts may be performed in a different order than that illustrated and described. Additionally, the methods can omit some acts, and/or employ additional acts.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

While certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method, implemented by a server, for targeted delivery and monitoring consumption of content to a computer controlled by an employee of an organization, the method comprising the steps of:
   (a) determining whether to target the computer for delivery of the content by evaluating content contextual information associated with the employee in accordance with a rules database;
   (b) causing the content to be transmitted to the computer via a communications network, conditional on determining that the computer is to be targeted;
   (c) receiving, via the communications network, data indicative of an input by the employee to the computer causing the computer to display graphical markers beside of the content on a display device of the computer, the graphical markers being arranged chronologically and comprising arrows indicative of scrolling input and speed by the employee;
   (d) generating one or more of, a read score, and an awareness score on the consumption of the content based on the data indicative of the input; and
   (e) tracking and collecting data indicative of the input over time, wherein the server learns to determine further content delivery and to optimize content consumption to the employee.

2. The method of claim 1 wherein the content contextual information comprises an indicator of an expressed interest in the content by the employee.

3. The method of claim 1 wherein the method further comprises determining the content contextual information by analyzing the computer's interaction with an information management system.

4. The method of claim 1 wherein the method further comprises determining the content contextual information by determining data indicative of prior content consumption at the computer.

5. The method of claim 4 wherein determining data indicative of prior content consumption at the computer comprises receiving, via the communications network, and evaluating data indicative of an input by the employee to the computer causing the computer to modify a display of the prior content on a display device of the computer.

6. The method of claim 5 wherein the input causes the computer to display or stop displaying the prior content on the display device of the computer.

7. The method of claim 5 wherein determining data indicative of prior content consumption at the computer further comprises determining a time associated with the input by the employee to the computer.

8. The method of claim 1 wherein the method further comprises determining a content delivery factor for transmitting the content to the computer, based on the content contextual information.

9. The method of claim 8 wherein the content delivery factor comprises a time for transmitting the content to the computer.

10. The method of claim 8 wherein the content delivery factor comprises an alert type or notification level to be associated with the content when transmitted to the computer.

11. A system for targeted delivery of content to a computer controlled by an employee of an organization, the system comprising a server comprising a processor and a non-transitory memory storing instructions executable by the processor to implement the steps of:
  (a) determining whether to target the computer for delivery of the content by evaluating content contextual information associated with the employee in accordance with a rules database;
  (b) causing the content to be transmitted to the computer via a communications network, conditional on determining that the computer is to be targeted;
  (c) receiving, via the communications network, data indicative of an input by the employee to the computer causing the computer to display graphical markers beside the content on a display device of the computer, the graphical markers being arranged chronologically and comprising arrows indicative of scrolling input and speed by the employee;
  (d) generating one or more of, a read score, and an awareness score on the consumption of the content based on the data indicative of the input; and
  (e) tracking and collecting data indicative of the input over time, wherein the server learns to determine further content delivery and to optimize content consumption to the employee.

12. A non-transitory computer-readable medium storing instructions executable by a processor to implement the steps of:
  (a) determining whether to target the computer for delivery of the content by evaluating content contextual information associated with the employee in accordance with a rules database;
  (b) causing the content to be transmitted to the computer via a communications network, conditional on determining that the computer is to be targeted;
  (c) receiving, via the communications network, data indicative of an input by the employee to the computer causing the computer to display graphical markers beside the content on a display device of the computer, the graphical markers being arranged chronologically and comprising arrows indicative of scrolling input and speed by the employee;
  (d) generating one or more of, a read score, and an awareness score on the consumption of the content based on the data indicative of the input; and
  (e) tracking and collecting data indicative of the input over time, wherein the server learns to determine further content delivery and to optimize content consumption to the employee.

* * * * *